May 2, 1939.  J. K. WOOD  2,156,468
SPRING DEVICE
Filed May 22, 1936  2 Sheets-Sheet 2
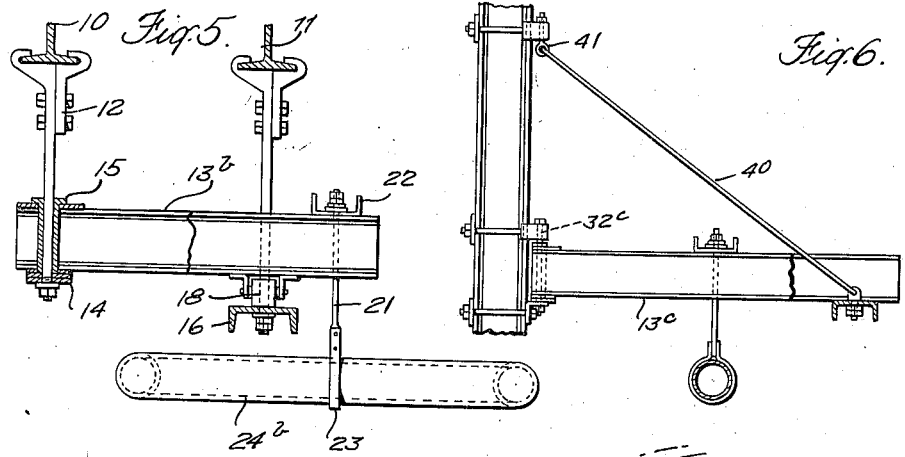
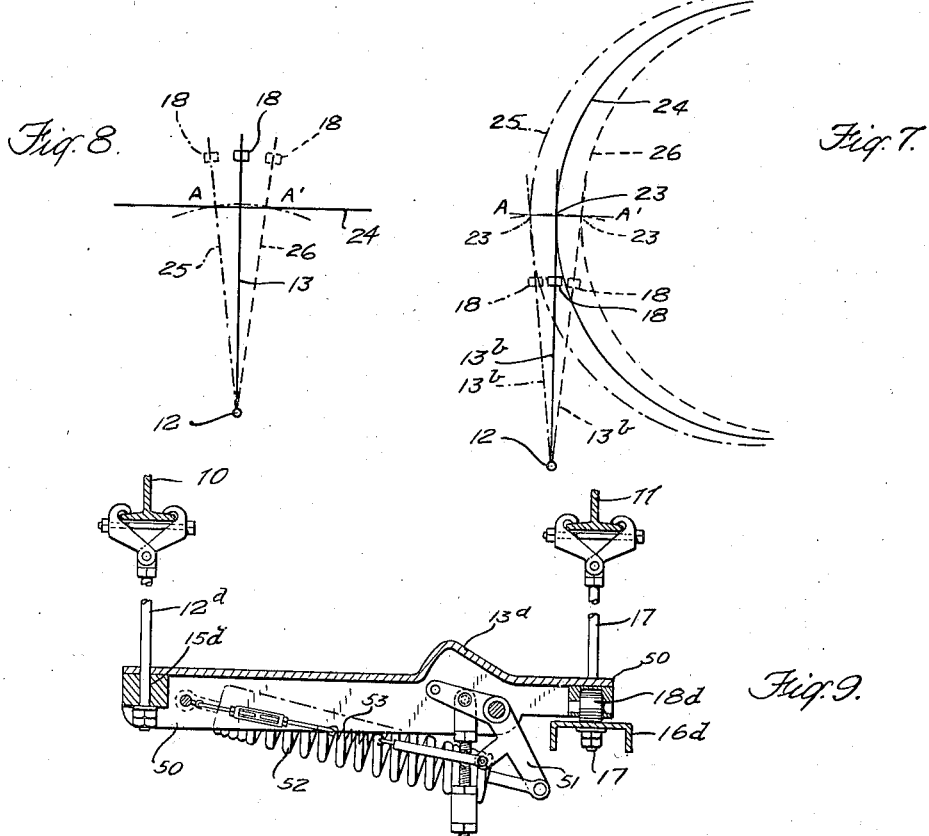
INVENTOR
JOSEPH KAYE WOOD.
BY
ATTORNEYS Patented May 2, 1939

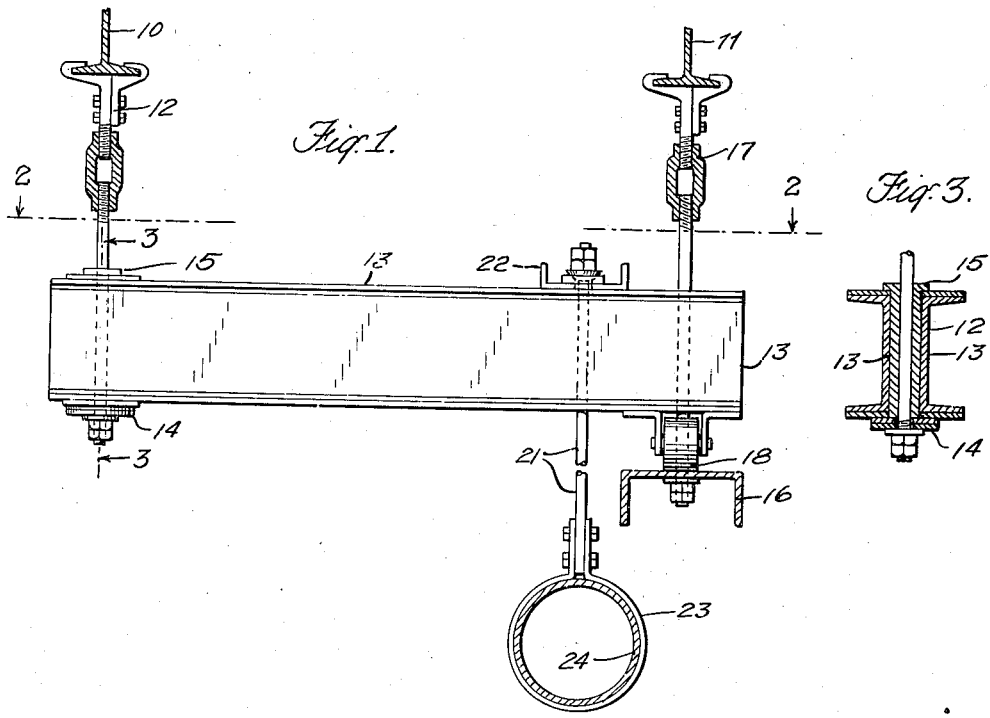
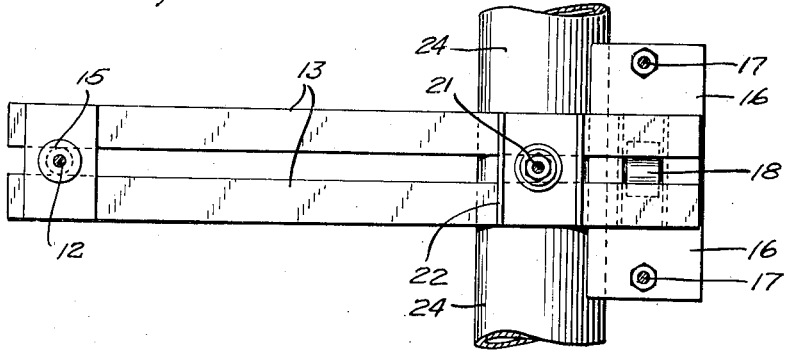
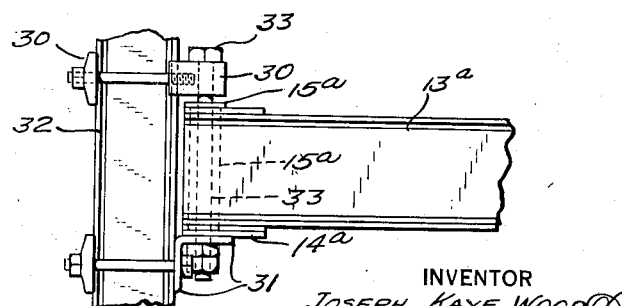

2,156,468

UNITED STATES PATENT OFFICE 2,156,468

SPRING DEVICE

Joseph Kaye Wood, Mount Vernon, N. Y., assignor to General Spring Corporation, New York, N. Y., a corporation of New York Application May 22, 1936, Serial No. 81,186

6 Claims. (Cl. 248—54)

This invention relates to a support and particularly a movable support adapted for use in connection with high temperature apparatus whereby to provide for thermal expansion of such apparatus. The invention also relates to high temperature apparatus in which such a support is used.

It has been common practice prior to my invention to support high temperature equipment with movable supporting devices which are adapted to follow the movement of the supported part which is due to thermal expansion thereof. For this purpose rollers have been ordinarily provided to take care of horizontal movement and springs or spring devices or weighted balances have been used to care for vertical movement.

Such devices have not proven wholly satisfactory. Simple rollers supporting a pipe accommodate movement in only one direction, whereas pipe lines frequently expand with an irregular path or even a writing motion which is not so simply controlled. Furthermore, such rollers do not show at any distance whether they are operable. The rollers may be rusted or binding, so that the piping is being subjected to serious strains, without any indication of such condition being apparent. Furthermore, with high temperature piping, special costly and less efficient lagging is required to provide a bearing surface for such rollers.

Devices capable of universal movement to follow the true path of piping have been designed prior to my invention but they have been expensive and cumbersome and frequently precluded by space limitations of actual installations. Such devices have in the past usually been miniature travelling cranes having a beam across the pipe with roller trucks at each end and a traveller mounted to slide across the beam. If the traveller is moved to one end of the beam the expansion force exerted against it tends to move that end of the beam ahead of the other and consequently to bind the beam between its rails.

According to my present invention these difficulties are avoided by connecting the load to a member movable approximately in a horizontal plane so that in its movement the point at which the load is connected to it follows a path with approximately the median line of the path of the point of connection on the load when thermally expanding. Lateral variations from the median line may thus be compensated for e. g., by a swinging link without substantially changing the points of connection on the movable support member and on the load.

Furthermore, according to my invention the point of connection on the movable support member is chosen so that a force applied along the median line of the said expansion path has substantially no tendency to bind the said support member or to move it off its proper path.

In a preferred aspect my invention utilizes a swinging support member with its point of connection to the load at sufficient radius and so positioned that, in the normal expansion range, the arc described by said point of connection approximates the form and direction of the true expansion path of said point of connection on the load; and then for the slight variations between the true expansion path and said arc of the swinging member another relatively compact member may be provided which is adapted to move in a plane transverse to the plane of movement of said swinging support member. Since the amount of these variations is slight the device chosen for this lateral movement is of less importance; it may be a swinging link, it may be a flexible member, e. g., a spring device or it may be a sliding member, e. g., a roller member.

In this invention I am not particularly concerned with vertical movements of the load, and if there is any, I may use any of the known devices for taking up such vertical expansion as may occur. It is an advantage of my invention, however, that a device embodying my invention may be designed for any particular use where horizontal and vertical expansion occur together, so that both will be compensated for without seriously objectionable variations in the support which is offered to the load.

Accordingly, it is an object of my invention to provide a simple apparatus to care for horizontal thermal expansion in high temperature apparatus.

Another object of my invention is to provide a supporting device which is readily adaptable to varying conditions of use and to various types of vertical support whether rigid, spring, weighted, or any other type.

Another object of my invention is to provide a support for high temperature piping which is adapted to accommodate horizontal movement in a direction transverse to the axis of the pipe at the point of support.

In the accompanying drawings I have shown a preferred embodiment of my invention and various modifications thereof. I have chosen these with a view to illustrating the principle of my invention and the best methods of applying it to practical use so that others skilled in the art may be able to utilize my invention in varying forms as may be best suited to varying requirements of different conditions of use. Accordingly, it is to be understood that the particular construction shown in the drawings and the particular modification suggested herein are in no sense exhaustive or limiting, but are to be taken only as examples illustrative of the invention.

Fig. 1 is a view in side elevation and partly in vertical section of a simple device embodying my invention as applied to a pipe hanger.

Fig. 2 is a top plan view of the same hanger as is shown in Fig. 1, taken on line 2—2 of Fig. 1.

Fig. 3 is a vertical section taken on line 3—3 of Fig. 1.

Fig. 4 is a view in side elevation partly broken away of a cantilever type pipe hanger.

Fig. 5 is a view in side elevation of a semi-cantilever type pipe hanger mounted to support a bend in a high temperature pipe line.

Fig. 6 is a view in side elevation of a suspension type pipe hanger.

Fig. 7 is a diagrammatic plan view showing the movement of a pipe hanger embodying my invention and a pipe bend such for example as those shown in Fig. 5.

Fig. 8 is a similar diagrammatic view of a pipe hanger embodying my invention with a pipe subject only to longitudinal expansion; and Fig. 9 is a view partly in side elevation and partly in vertical section of a constant support hanger designed to accommodate both vertical and horizontal movement.

Referring first to Fig. 1, I have shown in section two members 10 and 11 of the steel frame of a building or other apparatus. A clamp 12 is secured to the lower flange of the beam 10 and carries at its lower end a swinging span member 13 preferably with a thrust bearing 14 and a bushing 15 to reduce the friction of swinging movement of the span 13 about the pivot clamp 12.

From the flange of the beam 11 an inverted channel member 16 is supported by clamps 17 so that its upper surface provides a horizontal bearing rail.

A roller 18, which in the present instance is shown as a dustless ball bearing of usual type is secured under the end of the span 13.

At an intermediate point a support rod 21 is secured to the span 13, e. g., passing between the two channel members, of which the span 13 is made, and engaging the cross member 22 secured to their tops. This allows a limited swinging movement of the rod 21 in a plane longitudinal of the span 13. At its lower end the rod 21 carries a clamping ring 23 in which the pipe 24 is engaged.

The design of this device should advantageously be such that between the limits of normal movement, indicated for example by the broken lines 25 and 26 of Figs. 7 and 8, the roll 18 and the upper end of the supporting rod 21 follow arcuate paths the chords of which are substantially parallel to the movement of the pipe 24 at the band 23 upon thermal expansion of the pipe. Advantageously also the angle subtended at the pivot 12 by the arc between the extremes of normal movement is less than about 30 degrees and preferably less than about 20 degrees. The difference between the actual path of movement of the pipe at the band 23 and the arc described by the upper end of the rod 21 is taken care of by swinging of the rod on the member 22.

The apparatus shown is designed for supporting a pipe line which is subject to horizontal expansion with little or no vertical movement. If the line is subject also to expansion in a vertical direction a spring or weighted support or other vertical yieldable device, such for example as shown in my prior patents, Nos. 1,816,164 and 1,937,135, and my prior co-pending applications, Serial Nos. 20,511, filed May 9, 1935 and 746,076, filed September 29, 1934, may be used in place of the rod 21 and mounted on the swinging member 13. Or, with a horizontal structure such as that shown in my U. S. Patent No. 1,816,164 or in my British application No. 35,628 of 1935, I may use the frame of the support structure itself to replace the swinging member 13.

In Fig. 4, I have shown a cantilever type of swinging member. In this case fixed members 30—31 are suitably anchored, e. g., to a column 32. The fixed members 30—31 have a vertical pivot pin 33 on which the swinging member 13a is mounted. In the embodiment shown a thrust washer 14a and a bushing 15a provide the bearing surfaces for the swinging of the member 13a.

The outer end of the swinging member 13a may be the same as that shown in Fig. 1.

In operation this device as shown in Fig. 4 is essentially similar to that shown in Figs. 1 and 2 and as in the case already described above and as shown in Figs. 7 and 8, the swinging member is positioned so that the arc through which the upper end of the connecting member 37 moves is approximately parallel to the path normally described by the part of the load which is engaged by the lower end of the member 21 (not shown in this figure) during thermal expansion.

In Fig. 5, I have shown another embodiment of my invention. In this case the swinging member 13b is supported from the flange of the frame 10 by a pivot clamp 12 and is provided with thrust bearing 14 and a bushing 15.

A supporting rail 16 similar to the rail 16 of Fig. 1 is provided but in this case it is closer to the pivot clamp 12 and a roller 18 which is mounted on the bottom of the swinging member 13a toward the pivot from the support rod 21 so that it bears on the upper face of the rail 16.

Near its outer end the swinging member 13b carries the support rod 21 which in this case has its clamping ring 23 transverse to the swinging member to engage the pipe bend 24b.

The departure of the arc A—A' from the straight line path of the support point 23 is, as already described, taken care of by swinging of the rod 21.

In Fig. 6, I have shown a suspension type swinging member. The purpose and operation of this will be obvious from what has already been said in connection with the other figures, but in this case instead of carrying the load entirely on the pin 32c, the swinging member 13c is supported also by the suspension member 40 secured to its outer end and to the eye bolt 41 in the wall above the pivot pin 32c.

In Fig. 7, I have shown diagrammatically how the invention operates when applied to a pipe line where the resultant of expansion is not longitudinal of the pipe at the point of support, e. g., as in the case illustrated in Fig. 5. I have chosen this illustration to emphasize the fact that with any expanding member a given support point will tend to follow a path which can be approximated by some arc. In the design of a support according to my invention the normal path of expansion is determined and the radius and pivot positions of the swinging member are then determined to give an arc which closely approximates this path of movement.

In the case illustrated in Fig. 7 the pipe 24b at the point of support 23 will follow a path A—A' which is nearly a straight line perpendicular to the axis of the pipe at the support point 23 and consequently the swinging member 13b instead of being transverse to the pipe is positioned longitudinally at the point of support.

In Fig. 9, I have shown an embodiment of my invention which also includes the inventions of my said prior patents and applications referred to above. In this case, instead of a simple swinging member 13, 13a, 13b or 13c I use as the swinging member 13d, a constant support device which comprises a frame 50 with a compensating lever 51 pivoted in the frame 50 near one end thereof and springs 52 and 53 pivotally connected near the opposite end thereof. The springs 52 and 53 are connected also to one end of the compensating lever 51; and the connection 54 to the load is pivotally carried by the opposite end of the compensating lever 51. The relations of these several pivots, the solid lengths and the load deflection rates of the springs 52 and the characteristic and the range of action of the booster spring 53 are all matters which have been fully disclosed in my said prior applications and patents and need not be repeated here. Suffice it to say that if these are properly designed according to the principles disclosed in my said prior applications and patents the load may be moved vertically through a substantial range without substantial variation in the support afforded to it.

According to the present invention the frame 50 is extended at one end beyond the point of attachment of the springs 52 and 53 and is provided with a vertical bearing 15d by which it is pivotally mounted on the clamp 12d and at its other end the frame 50 is extended beyond the compensating lever 51 and is provided with a roller 18d which operates on the rail 16d substantially corresponding to the rail 16 shown in Fig. 1. The connection 54, as already stated, is pivotally connected to the compensating lever 51 so that it may swing in a plane longitudinal of the member 13d. Thus in operation this device performs all of the functions described for the construction illustrated in Fig. 1. In addition, however, it accommodates substantial vertical movement of the pipe; and it also has the advantage that a greater radial swing of the connection 54 may be permitted because the departure of its swinging arc from a horizontal line can be fully taken care of by the constant tension yielding device 13d. Thus, for example, with a relatively long expansion travel in a horizontal direction a shorter radius in the member 13d may be permitted than, for example, could be permitted in the embodiment illustrated in Fig. 1. These advantages can also be realized with the device 13d mounted for straight-line movement, e. g., upon rolls operating in a track, advantageously parallel to the median line of the movement of the point of support of the load.

With a device of this kind, which is adapted to accommodate the vertical variations resulting from the arcuate swinging in a vertical plane, it is practicable to support the device 13d by vertical swinging members which swing in a plane transverse to that of the swinging of the connection 54. Ordinarily, however, this is not practicable because of space considerations which limit the vertical distance above the pipes but allow adequate room for a horizontal swinging member.

I claim:

1. A support for high temperature piping and the like which comprises anchoring means, a swinging member pivotally mounted thereon for swinging about a vertical axis, means for connecting the swinging member to the high temperature equipment at a point thereon which is subject to movement by thermal expansion, the swinging member being positioned relative to the point at which the connecting means engages the high temperature equipment, so that, in an intermediate position thereof, the plane defined by said axis and said support point is approximately perpendicular to the median line of the path followed by the support point during thermal expansion from atmospheric temperature to operating temperature, a roller mounted radially on the swinging member near its outer end, and a rail adapted to provide a bearing surface for said roller in its movement with the swinging member, whereby to support the outer end of said swinging member.

2. A support for high temperature piping and the like which comprises anchoring means, a swinging member pivotally mounted thereon for swinging about a vertical axis, means for connecting the swinging member to the high temperature equipment at a point thereon which is subject to movement by thermal expansion, the swinging member being positioned relative to the point at which the connecting means engages the high temperature equipment, so that, in an intermediate position thereof, the plane defined by said axis and said support point is approximately perpendicular to the median line of the path followed by the support point during thermal expansion from atmospheric temperature to operating temperature, and the connecting means being adapted to have a substantial swinging movement in a plane longitudinal of the swinging member, whereby to accommodate departure of the path of movement of the support point from the arc described by the swinging member.

3. A support for high temperature piping which comprises three anchoring members spaced apart, two of which are spaced a distance greater than the horizontal movement of the part of the equipment which is to be supported, and the third is spaced from both along a line approximately perpendicular to the line between the first two, a span between said two anchoring members and having a bearing surface therebetween substantially parallel to the path of the supported part during thermal expansion of said equipment, a second span pivoted on the third anchoring member and having a portion borne on the bearing surface of the first span, and means for connecting the supported part to said second span and adapted to permit relative movement of said part radially to said span to accommodate departure of the arc of said span from the path of movement of said part.

4. In a support for high temperature piping a constant tension supporting device comprising a horizontal frame, a compensating lever pivoted near one end thereof and having springs connected between the opposite end of the frame and the compensating lever, a swinging link connected at one end to the pipe and at its other to the compensating lever, anchoring means pivotally connected to one end of the frame for movement about a vertical axis, a roller on the opposite end of said frame transverse thereto for rolling in an arcuate path about said axis, and a horizontal rail fixed beneath said roller and adapted to provide a bearing surface for the roller in its arcuate path.

5. A support for high temperature piping and the like as defined in claim 2, in which the swinging member is a cantilever supported on the anchoring means wholly at its said axis.

6. A support as defined in claim 1 in which the connecting means comprises a constant tension extensible device adapted to exert a tension approximately equal to the support required by the high temperature equipment.

JOSEPH KAYE WOOD.